(12) United States Patent
Kashiwagi et al.

(10) Patent No.: US 10,730,214 B2
(45) Date of Patent: Aug. 4, 2020

(54) DECORATIVE SHEET, MOLDED-ARTICLE MANUFACTURING METHOD, AND MOLDED ARTICLE

(71) Applicant: Nissha Co., Ltd., Kyoto-shi, Kyoto (JP)

(72) Inventors: Masaki Kashiwagi, Kyoto (JP); Isao Yamamoto, Kyoto (JP); Shinichi Kitamura, Kyoto (JP); Takenori Yoshida, Kyoto (JP); Michiyasu Okuda, Kyoto (JP)

(73) Assignee: NISSHA CO., LTD., Kyoto-Shi, Kyoto (JP)

( * ) Notice: Subject to any disclaimer, the term of this patent is extended or adjusted under 35 U.S.C. 154(b) by 170 days.

(21) Appl. No.: 15/569,508

(22) PCT Filed: Mar. 31, 2016

(86) PCT No.: PCT/JP2016/060768
§ 371 (c)(1),
(2) Date: Oct. 26, 2017

(87) PCT Pub. No.: WO2016/174989
PCT Pub. Date: Nov. 3, 2016

(65) Prior Publication Data
US 2018/0297252 A1 Oct. 18, 2018

(30) Foreign Application Priority Data
Apr. 28, 2015 (JP) ................. 2015-091342

(51) Int. Cl.
*B29C 45/14* (2006.01)
*B32B 27/36* (2006.01)
(Continued)

(52) U.S. Cl.
CPC .... *B29C 45/14311* (2013.01); *B29C 45/0005* (2013.01); *B29C 45/14811* (2013.01);
(Continued)

(58) Field of Classification Search
None
See application file for complete search history.

(56) References Cited

U.S. PATENT DOCUMENTS

| | | | |
|---|---|---|---|
| 5,023,120 A * | 6/1991 | Akao | B29C 55/023 428/35.9 |
| 6,099,947 A * | 8/2000 | Pushpalal | B29C 70/025 428/295.4 |

(Continued)

FOREIGN PATENT DOCUMENTS

| | | |
|---|---|---|
| CN | 1211950 A | 3/1999 |
| GB | 1472150 A | 5/1977 |

(Continued)

OTHER PUBLICATIONS

International Search Report dated Jul. 5, 2016 for corresponding foreign Application No. PCT/JP2016/060768, 2 pp.

*Primary Examiner* — Megan McCulley
(74) *Attorney, Agent, or Firm* — United IP Counselors, LLC

(57) ABSTRACT

A decorative sheet decorates a molded-article body in which a fiber-reinforced part, which constitutes a molded article with the molded-article body and contains a matrix resin having fibers and an epoxy group, is exposed to a surface. The decorative sheet includes an adhesive layer containing an amino-group-containing compound, the adhesive layer having an amino group that reacts with the matrix resin when bonding with the fiber-reinforced part. The decorative sheet also includes a decorative layer disposed on the adhesive layer and for decorating the surface of the molded-article body. The decorative sheet also includes a base film that is disposed on the decorative layer and has a polycarbonate-resin layer containing a polycarbonate resin and an inner-side acrylic-resin layer containing an acrylic resin. The inner-side acrylic-resin layer is disposed on the decorative (Continued)

layer, and the polycarbonate-resin layer is disposed on the inner-side acrylic-resin layer.

19 Claims, 8 Drawing Sheets

(51) Int. Cl.

| | | |
|---|---|---|
| *B32B 27/12* | (2006.01) | |
| *B32B 27/08* | (2006.01) | |
| *B32B 27/00* | (2006.01) | |
| *B32B 27/30* | (2006.01) | |
| *B29C 45/00* | (2006.01) | |
| *B32B 7/12* | (2006.01) | |
| *B32B 27/38* | (2006.01) | |
| *B29K 63/00* | (2006.01) | |
| *B29K 105/12* | (2006.01) | |
| *B29K 669/00* | (2006.01) | |
| *B29L 31/00* | (2006.01) | |

(52) U.S. Cl.
CPC ............... *B32B 7/12* (2013.01); *B32B 27/00* (2013.01); *B32B 27/08* (2013.01); *B32B 27/12* (2013.01); *B32B 27/30* (2013.01); *B32B 27/308* (2013.01); *B32B 27/36* (2013.01); *B32B 27/365* (2013.01); *B32B 27/38* (2013.01); *B29K 2063/00* (2013.01); *B29K 2105/12* (2013.01); *B29K 2669/00* (2013.01); *B29K 2715/006* (2013.01); *B29L 2031/722* (2013.01); *B32B 2260/021* (2013.01); *B32B 2260/046* (2013.01); *B32B 2262/0269* (2013.01); *B32B 2262/10* (2013.01); *B32B 2262/101* (2013.01); *B32B 2262/103* (2013.01); *B32B 2262/106* (2013.01); *B32B 2307/306* (2013.01); *B32B 2307/732* (2013.01); *B32B 2451/00* (2013.01)

(56) References Cited

U.S. PATENT DOCUMENTS

| | | | |
|---|---|---|---|
| 6,617,008 | B1 | 9/2003 | Kono et al. |
| 6,974,554 | B2 * | 12/2005 | Cox ..................... B01D 63/022 |
| | | | 264/40.6 |
| 2002/0172354 | A1 * | 11/2002 | Nishi ..................... H01H 13/70 |
| | | | 379/433.07 |
| 2003/0067099 | A1 * | 4/2003 | Miller ............... B29C 45/14811 |
| | | | 264/447 |
| 2003/0143389 | A1 * | 7/2003 | Tachibana ................ B32B 7/12 |
| | | | 428/317.1 |
| 2005/0048214 | A1 * | 3/2005 | Mack ................... C09D 133/04 |
| | | | 427/402 |
| 2008/0308212 | A1 * | 12/2008 | Sheasley ............... C09J 163/00 |
| | | | 156/78 |
| 2013/0129990 | A1 * | 5/2013 | Shibata ................... B32B 27/08 |
| | | | 428/195.1 |
| 2016/0200082 | A1 | 7/2016 | Awa et al. |

FOREIGN PATENT DOCUMENTS

| | | |
|---|---|---|
| JP | S51127861 A | 11/1976 |
| JP | 2000158481 A | 6/2000 |
| JP | 2004098343 A | 4/2004 |
| WO | 2015/046568 A1 | 4/2015 |

* cited by examiner (a)

(b)

DECORATIVE SHEET, MOLDED-ARTICLE MANUFACTURING METHOD, AND MOLDED ARTICLE

CROSS-REFERENCES TO RELATED APPLICATIONS

This application is the U.S. National Phase of PCT International Application No. PCT/JP2016/060768, filed on Mar. 31, 2016. That application claims priority to Japanese Patent Application No. 2015-091342, filed on Apr. 28, 2015. The contents of both applications are herein incorporated by reference in their entirety.

BACKGROUND

Technical Field

The present disclosure relates to a decorative sheet, a molded-article manufacturing method, and a molded article, and particularly relates to: a decorative sheet for decorating a molded article having a fiber-reinforced part that is reinforced by fibers; a method of manufacturing the molded article formed using the decorative sheet; and the molded article decorated by the decorative sheet.

Background Art

In recent years, fiber-reinforced composite materials, in which carbon fibers or the like are used, are used in various products, such as sporting goods, daily commodities, such as umbrellas and canes, aircraft, and architectural members, for all of which there is a demand for reduced weight and high strength.

A fiber-reinforced composite material is a material in which a matrix resin and fibers are composited. In the decoration of a fiber-reinforced composite material in which fibers are composited, the fibers become a hindrance, making it difficult to strongly adhere a decorative layer to the fiber-reinforced composite material; moreover, if the fiber-reinforced composite material is one in which a matrix resin cures (or hardens) an epoxy resin, then it is difficult to bond the decorative layer to the matrix resin after it has been cured.

For example, Japanese Unexamined Patent Application Publication No. S51-127861 describes a method of manufacturing a marble-patterned tub, wherein a fiber-reinforced plastic (FRP) is used in the tub as a reinforcing layer. In the tub-manufacturing method described in Japanese Unexamined Patent Application Publication No. S51-127861, an acrylic-resin board having a sheet thickness of approximately 3-5 mm undergoes decoration. Subsequently, the acrylic-resin board, which thus has a comparatively large sheet thickness, and the FRP are adhered, and thereby the tub is complete.

If an acrylic-resin board having a sheet thickness of as much as 3-5 mm is used, as in the tub described in Japanese Unexamined Patent Application Publication No. S51-127861, then the acrylic-resin board can withstand comparatively high pressures and temperatures, and therefore it is comparatively easy to manufacture a molded article that is reinforced with FRP and that is decorated. However, it is difficult to decorate the main body of a molded article—using a decorative sheet in which the thickness is less than 1 mm—wherein the fiber-reinforced composite material is exposed to the surface, and consequently problems arise such as the decorative sheet breaking or the decorative sheet being deformed by heat.

Accordingly, there is a technique, as described in Japanese Unexamined Patent Application Publication No. 2004-98343, in which a backing sheet is provided on a decorative sheet such that a decorative FRP (fiber-reinforced plastic) having a deep-drawn shape can be manufactured. In addition, one example of a technique of decorating FRP is a technique in which an injection-molding method is used, as described in Japanese Unexamined Patent Application Publication No. 2000-158481.

BRIEF SUMMARY

However, in the configuration of the decorative sheet described in Japanese Unexamined Patent Application Publication No. 2004-98343, the backing sheet contacts the FRP of the product main body, and consequently cases are seen in which sufficient adhesive strength with the decorative sheet is not obtained owing to the material constitution of the fiber-reinforced composite material, and therefore satisfactory decoration is difficult to obtain.

Accordingly, an object of the present disclosure is to provide a decorative sheet in which it is possible to satisfactorily decorate a molded-article body wherein a fiber-reinforced composite material is exposed to the surface. In addition, another object of the present disclosure is to provide: a molded article in which the molded-article body, wherein the fiber-reinforced composite material is exposed to the surface, has been satisfactorily decorated by the decorative sheet; and a method of manufacturing the same.

A plurality of aspects of the present disclosure are explained below as the technical solution. These aspects can be arbitrarily combined as needed.

A decorative sheet according to one aspect of the disclosure is a decorative sheet for decorating a molded-article body in which a fiber-reinforced part, which constitutes a molded article with the molded-article body and contains a matrix resin having fibers and an epoxy group, is exposed to a surface, comprising: an adhesive layer that contains an amino-group-containing compound having an amino group that reacts with the matrix resin when bonding with the fiber-reinforced part; a decorative layer that is disposed on the adhesive layer and is for decorating the surface of the molded-article body; and a base film that is disposed on the decorative layer and has a polycarbonate-resin layer containing a polycarbonate resin and an inner-side acrylic-resin layer containing an acrylic resin, wherein the inner-side acrylic-resin layer is disposed on the decorative layer and the polycarbonate-resin layer is disposed on the inner-side acrylic-resin layer.

In the decorative sheet comprising such structural elements, heat resistance that can withstand the heat applied when the epoxy group of the matrix resin and the amino group of the adhesive layer are caused to react is obtained by the polycarbonate-resin layer, and drawability (strength) that can withstand the force applied when the decorative sheet is caused to conform to the molded-article body is likewise obtained. In addition, printability needed to print the decorative layer on the base film is obtained by the inner-side acrylic-resin layer; in addition, it is possible to prevent the polycarbonate-resin layer from getting damaged during formation of the adhesive layer, which includes an amino-group-containing compound in which, for example, a solvent is used.

In addition, the base film may further comprise an outer-side acrylic-resin layer that contains an acrylic resin on the side opposite the inner-side acrylic-resin layer, wherein the inner-side acrylic-resin layer and the outer-side acrylic-resin layer sandwich the polycarbonate-resin layer. If configured in this manner, the outer-side acrylic-resin layer exists on the outer-surface side of the polycarbonate-resin layer, and therefore hardness is improved by the outer-side acrylic-resin layer on the surface side of the decorated molded article, the polycarbonate-resin layer is protected, the decorative sheet tends not to get scratched, and thereby the surface of the molded article is prevented from getting damaged.

In addition, the inner-side acrylic-resin layer preferably has a thickness that is greater than or equal to 5% of the thickness of the base film. If configured in this manner, satisfactory printability can be exhibited by the inner-side acrylic-resin layer.

In addition, in the range in which the inner-side acrylic-resin layer has a thickness that is greater than or equal to 5% of the thickness of the base film, the polycarbonate-resin layer preferably has a thickness that is greater than or equal to 50% of the thickness of the base film. If configured in this manner, satisfactory heat resistance can be exhibited by the polycarbonate-resin layer.

A molded-article manufacturing method according to one aspect of the disclosure comprises: a preparing process that prepares a decorative sheet comprising: an adhesive layer that contains an amino-group-containing compound; a decorative layer; and a base film whereon the adhesive layer and the decorative layer are formed; and a decorating process that decorates a surface of a molded-article body by the decorative layer by: bringing the adhesive layer of the decorative sheet into contact with the fiber-reinforced part of the molded-article body wherein a fiber-reinforced part, which contains a matrix resin having fibers and an epoxy group, is on the surface; and causing the matrix resin and an amino group of the amino-group-containing compound to react, thereby causing the adhesive layer to bond with the fiber-reinforced part, wherein, the base film has an inner-side acrylic-resin layer, which contains an acrylic resin, and a polycarbonate-resin layer, which contains a polycarbonate resin, wherein the inner-side acrylic-resin layer is disposed on the decorative layer and the polycarbonate-resin layer is disposed on the inner-side acrylic-resin layer.

In the molded-article manufacturing method comprising such steps, in the decorating process, heat resistance that can withstand the heat applied when the matrix resin and the amino group are caused to react is exhibited by the polycarbonate-resin layer, and drawability (strength) that can withstand the force applied when the decorative sheet is caused to conform to the molded-article body is exhibited. In addition, in the preparing process, printability needed to print the decorative layer on the base film is exhibited by the inner-side acrylic-resin layer; in addition, the polycarbonate-resin layer is prevented from getting damaged during formation of the adhesive layer, which includes an amino-group-containing compound in which, for example, a solvent is used.

In addition, the matrix resin may be formed of an epoxy resin. Because the matrix resin is formed of the epoxy resin, it becomes easy to manufacture the molded article that is light and has excellent strength.

In addition, the amino-group-containing compound may be a polyacrylamide resin, and the adhesive layer may be composed of a polyacrylamine as its main component. By having such a composition, stability of the adhesive layer is improved, and handling of the decorative sheet becomes easy.

In addition, the preparing process may be configured such that it includes a preform process that fabricates the decorative sheet from a planar shape into a three-dimensional shape that approaches the external shape of the molded article; and the decorating process may be configured such that the decorative sheet that was fabricated into the three-dimensional shape is disposed inside a die, heat and pressure are applied to the decorative sheet and the fiber-reinforced part by the die, and thereby the decorative sheet bonds to the fiber-reinforced part. If configured in this manner, the decorative sheet tends to conform to the external shape of the molded-article body, and thereby the finish of the external appearance of the molded article is improved.

In addition, it may be configured such that it further comprises: a preprocess that, prior to the decorating process, changes the matrix resin to a semi-cured state in which a reaction with the amino group of the amino-group-containing compound is possible, and plastically works the matrix resin; wherein, the decorating process is a simultaneous, forming-and-decorating process in which heat and pressure are applied to the decorative sheet that has been brought into contact with the matrix resin in the semi-cured state, and the matrix resin and the amino group of the adhesive layer react, and, simultaneously therewith, the fiber-reinforced part is formed.

By adopting such a configuration, owing to such a simultaneous, forming-and-decorating process, the unity of the decorative sheet and the molded-article body is improved, and the molded article having a beautiful external appearance, high strength, and reduced weight can be manufactured.

In addition, in the preprocess, the matrix resin may transition to the semi-cured state at a temperature that is higher than the heating temperature of the simultaneous, forming-and-decorating process. By adopting such a configuration, a matrix resin in a satisfactory semi-cured state is obtained, deterioration of the decorative sheet by the heat can be prevented, and it becomes easy to manufacture a molded article having a beautiful external appearance, high strength, and reduced weight.

In addition, the decorating process may be performed using a blow-molding method or a press-forming method. By adopting such a configuration, it becomes easy to apply pressure to the fiber-reinforced part by the blow-molding method or the press-forming method; in addition, when pressure has been applied to the fiber-reinforced part, the polycarbonate-resin layer of the base film exhibits appropriate pressure resistance, and thereby it becomes easy to perform deep drawing.

A molded article according to one aspect of the disclosure comprises: a molded-article body in which a fiber-reinforced part, which contains fibers and a matrix resin, is on a surface, and the matrix resin is formed of an epoxy resin; and a decorative sheet that is disposed on the molded-article body, is bonded to the fiber-reinforced part, and decorates the surface of the molded-article body; wherein, the decorative sheet comprises: an adhesive layer in which, when being bonded to the fiber-reinforced part, an amino group of the amino-group-containing compound is caused to react with an epoxy group of the matrix resin; a decorative layer that is disposed on the adhesive layer and that decorates the surface of the molded-article body; and a base film that is disposed on the decorative layer and comprises an inner-side acrylic-resin layer, which contains an acrylic resin, and a polycarbonate-resin layer, which contains a polycarbonate resin; in the base film, the inner-side acrylic-resin layer is disposed on the decorative layer, and the polycarbonate-resin layer is disposed on the inner-side acrylic-resin layer.

In the molded article comprising such structural elements, in the decorative sheet, heat resistance that can withstand the heat applied when the matrix resin and the amino group are caused to react is obtained by the polycarbonate-resin layer, and drawability (strength) that can withstand the force applied when the decorative sheet is caused to conform to the molded-article body is likewise obtained. In addition, in the decorative sheet, printability needed to print the decorative layer on the base film is obtained by the inner-side acrylic-resin layer; in addition, it is possible to prevent the polycarbonate-resin layer from getting damaged during formation of the adhesive layer, which includes an amino-group-containing compound in which, for example, a solvent is used. As a result, a molded article is obtained having a beautiful external appearance, high strength, and reduced weight.

According to the decorative sheet of the present disclosure, the molded-article body, in which the fiber-reinforced part composed of the fiber-reinforced composite material is exposed to the surface, can be satisfactorily decorated. In addition, according to the molded-article manufacturing method and the molded article of the present disclosure, a molded-article body, in which a fiber-reinforced part composed of a fiber-reinforced composite material is exposed to a surface, is satisfactorily decorated by a decorative sheet.

DETAILED DESCRIPTION OF EMBODIMENTS

First Embodiment

A molded-article manufacturing method according to a first embodiment of the present disclosure is explained below, with reference to the drawings.

(1) OVERVIEW OF THE CONFIGURATION OF THE MOLDED ARTICLE

Figure 1:
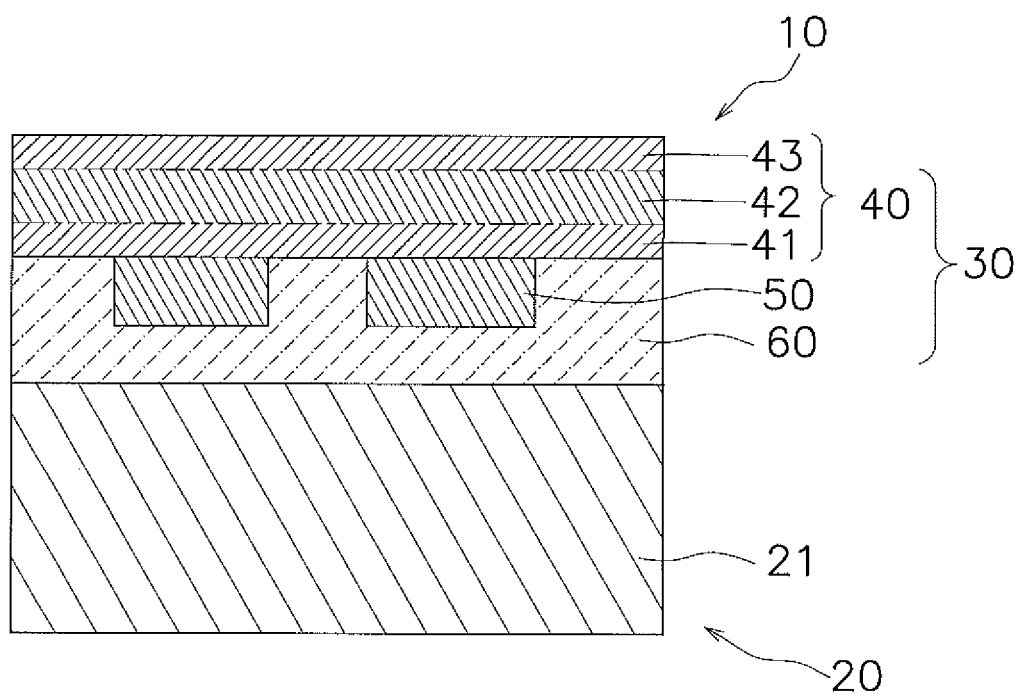
FIG. 1 is a partial, enlarged, cross-sectional view of the vicinity of the surface of a molded article according to a first embodiment.

FIG. 1 shows an enlargement of a decorative portion of the molded article formed by the molded-article manufacturing method according to the first embodiment. A molded article 10 comprises a molded-article body 20 and a decorative sheet 30. The decorative sheet 30 decorates a surface of the molded-article body 20.

(1-1) Molded-Article Body 20

The molded-article body 20 according to the first embodiment is formed of a fiber-reinforced composite material, the entire surface of which is composed of fibers and a matrix resin. That is, a fiber-reinforced part 21 shown in FIG. 1 is exposed to the entire surface of the molded-article body 20. The entirety of the molded-article body 20 may be formed of the fiber-reinforced composite material, but a portion of the molded-article body 20 may be formed of some other material, for example, a resin that does not contain fibers. In addition, the entire surface of the molded-article body 20 according to the first embodiment is formed of the fiber-reinforced composite material, which is composed of fibers and the matrix resin, but the present disclosure is applicable even in the case in which the fiber-reinforced part 21 is exposed to a portion of the surface of the molded-article body 20. The fibers used in the fiber-reinforced composite material of the molded-article body 20 are carbon fibers. Furthermore, the matrix resin is a resin in which the resin containing an epoxy group is cured by a curing agent. The resin containing the epoxy group is, for example, an epoxy resin. Here, the epoxy resin is a resinous substance having two or more epoxy groups (glycidyl groups) within a molecule; and, for example, a polyfunctional epoxy resin can be used as the epoxy resin. For example, a bisphenol-A-type epoxy resin, a bisphenol-F-type epoxy resin, a cresol-novolac-type epoxy resin, a novolac-type epoxy resin, a biphenyl-type epoxy resin, a naphthalene-type epoxy resin, a glycidyl-ester-type epoxy resin, an aromatic-amine-type epoxy resin, a resorcinol-type epoxy resin, an alicyclic epoxy resin, or a combination thereof can be used as the polyfunctional epoxy resin. For example, an aromatic-amine-type curing agent, an acid-anhydride-based curing agent, a hydrazide-based phenol curing agent, a dicyandiamide-based curing agent, or a polyamide-based curing agent can be used as the curing agent of the epoxy resin. A latent-curing agent is preferably used as the curing agent of the epoxy resin.

(1-2) Decorative Sheet 30

The decorative sheet 30 comprises a base film 40, a pattern layer 50, and an adhesive layer 60. The base film 40 supports the pattern layer 50 and the adhesive layer 60; after the molded article 10 has been decorated, an upper layer of the molded-article body 20, that is, the surface side of the molded article 10, protects the pattern layer 50. The base film 40 of the first embodiment comprises two types of resin films in three layers, which, from the surface side of the molded article 10, are disposed as an outer-side acrylic-resin layer 43, a polycarbonate-resin layer 42, and an inner-side acrylic-resin layer 41. The outer-side acrylic-resin layer 43 and the inner-side acrylic-resin layer 41 are formed of an acrylic resin by, for example, extrusion molding; and the polycarbonate-resin layer 42 is formed of a polycarbonate resin by, for example, extrusion molding. For example, the base film 40 is manufactured by simultaneously extrusion molding these three resin layers and then, simultaneously therewith, co-extruding the stacked layers. To make manufacturing easy in the case of co-extrusion in this manner, it is preferable that the inner-side acrylic-resin layer 41 and the outer-side acrylic-resin layer 43 have the same thickness and are formed symmetrically such that they sandwich the polycarbonate-resin layer 42; in addition, co-extrusion is preferably performed using, as the resins that constitute the inner-side acrylic-resin layer 41 and the outer-side acrylic-resin layer 43, acrylic resins that have the same characteristics. However, the method of manufacturing the base film 40 is not limited to the molding of multiple layers by co-extrusion as discussed above, and the base film 40 may be manufactured using some other manufacturing method such as a thermo-laminate.

The thickness of the base film 40 is ordinarily 50-400 µm and is preferably 100-200 µm. Because the pattern layer 50 is formed by a printing method, the base film 40 is required to be suitable for printing. Because the pattern layer 50 is printed on the inner-side acrylic-resin layer 41, the thickness of the inner-side acrylic-resin layer 41 is preferably greater than or equal to 5% of the thickness of the base film 40 in order to obtain satisfactory printability. In addition, the inner-side acrylic-resin layer 41 of this type serves to protect the polycarbonate-resin layer 42 during the formation of the adhesive layer 60, which contains, for example, an amino-group-containing compound in which a solvent is used. Because the heat resistance of the polycarbonate-resin layer 42 within the base film 40 is high, the thickness of the polycarbonate-resin layer 42 is preferably greater than or equal to 50% of the thickness of the base film 40 in order to obtain satisfactory heat resistance of the base film 40. It is often the case that the outer-side acrylic-resin layer 43 is exposed to the surface of the molded article 10; therefore, to maintain the aesthetic design of the molded article 10, the outer-side acrylic-resin layer 43 is preferably formed such that it exhibits a hardness of H or greater in a pencil-hardness test (750 g load) that conforms with JIS K 5600-5-4.

In the molded article 10, the pattern layer 50 is disposed on an inner side of the base film 40, that is, on a lower layer of the base film 40.

The pattern layer 50 is a layer for expressing a design such as a pattern. The pattern layer 50 is formed on the base film 40 by, for example, a gravure-printing method or a screen-printing method. The material of the design ink used in the printing of the pattern layer 50 contains, for example, a binder resin and a pigment or dye, which is added to the binder resin. In addition, the pattern layer 50 may be a metal-thin-film layer formed by depositing a metal using, for example, a vacuum-evaporating method or a sputtering method; in addition, the pattern may be formed by performing an etching method on the metal-thin-film layer. The pattern layer 50 may be designed with a metallic tone by using, for example, an aluminum paste or a mirror ink that has been subjected to an insulating treatment. Furthermore, a topcoat layer may be formed on the pattern layer 50 to enhance durability. The pattern layer 50 is formed with a thickness of, for example, several hundred nanometers to several tens of micrometers.

The design ink used in the formation of the pattern layer 50 is preferably a one-liquid type in which a thermoplastic resin is used as the binder resin. This is because, compared to a two-liquid type in which a thermosetting resin is used as the binder resin in the design ink, such a one-liquid-type design ink tends not to enter cracks in the pattern layer 50 when the decorative sheet 30 is folded at a sharp angle. The thermoplastic resin used as the binder resin of the design ink is, for example, an acrylic resin, a vinyl chloride/vinyl acetate copolymer resin, a thermoplastic-urethane-based resin, or a polyester-based resin.

The adhesive layer 60 is disposed on the lower layer of the pattern layer 50. The adhesive layer 60 is the layer for bonding the decorative sheet 30 to the fiber-reinforced part 21 of the molded-article body 20. Because the matrix resin of the fiber-reinforced part 21 has an epoxy group, the adhesive layer 60 has an amino group in order to increase its adhesive strength with the fiber-reinforced part 21. The epoxy group of the matrix resin and the amino group of the adhesive layer 60 cause a chemical reaction and bond, and thereby the adhesive strength between the matrix resin and the adhesive layer 60 is increased.

The adhesive layer 60 is formed, for example, using a polymer, which has an amino group as a functional group, as the principal material. The polymer having an amino group as a functional group is, for example, polyacrylamine, polyacrylamide resin, or polyamide resin. The polyacrylamine is, for example, an amino ethylated acrylic polymer. The polymer having such an amino group as the functional group is formed as the adhesive layer 60 by, for example, dissolving the polymer in a solvent and using a well-known thin-film manufacturing technique such as the printing method described above. In addition, the adhesive layer 60 can also be formed by using a resin as the principal material and mixing that resin with a compound having an amino group as its functional group. An example of a mixture of a resin and a compound having an amino group as its functional group is a mixture of an epoxy resin and an amino-based curing agent. Such a mixture can be formed as the adhesive layer 60 by, for example, dissolving the mixture in a solvent and using a well-known thin-film manufacturing technique such as the printing method described above.

(2) OVERVIEW OF MOLDED-ARTICLE MANUFACTURING METHOD

FIG. 2(a) to FIG. 2(e) schematically show one example of a method of manufacturing the molded article 10. The method of manufacturing the molded article 10 shown in FIG. 2(a) to FIG. 2(e) is an application of a blow-molding method.

(2-1) Preparing Process

Figure 2:
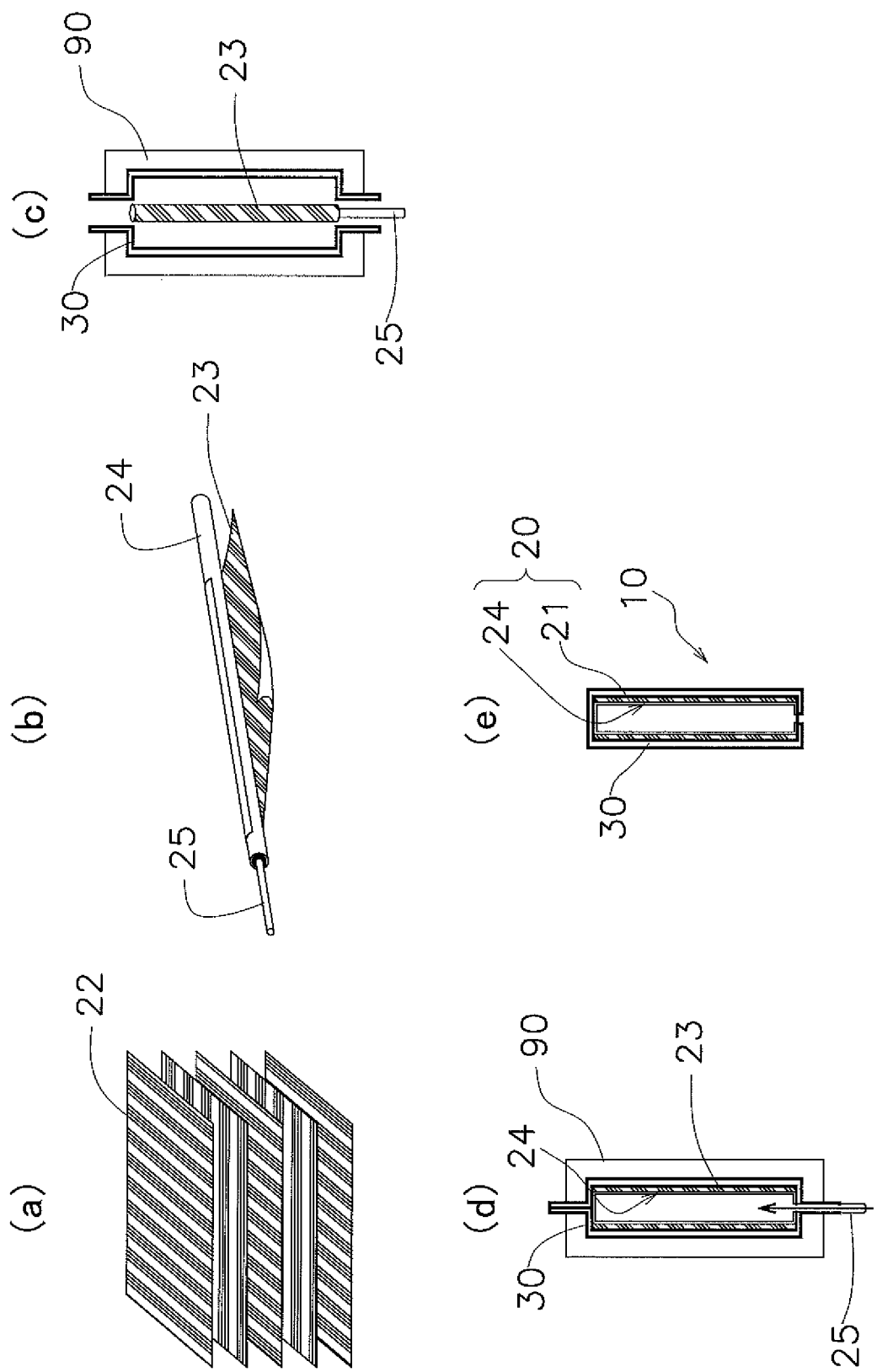
FIG. 2 includes: (a) a conceptual diagram that shows a process of preparing a prepreg; (b) a conceptual diagram that shows a process of fabricating the prepreg; (c) a conceptual diagram that shows a process of preparing a decorative sheet; (d) a conceptual diagram that shows a decorating process; and (e) a conceptual diagram for explaining the molded article.

First, the decorative sheet 30 shown in FIG. 1 is prepared in the state prior to being bonded. That is, the pattern layer 50 is printed on the base film 40, which has been manufactured in three layers of two types (i.e. three layers wherein a resin of two layers is different from that of the other layer), the adhesive layer 60 is formed on the base film 40, whereon the pattern layer 50 has been subsequently formed, and thereby the decorative sheet 30 is obtained. In the preform process, the decorative sheet 30 is fabricated into the cavity shape, or close to the cavity shape, of a die 90 shown in FIG. 2(c). Furthermore, as shown in FIG. 2(c), it is set inside the cavity of the die 90. Here, the decorative sheet 30 is fabricated into the cavity shape of the die 90 by the preform process; however, the preform process is not limited to the case in which the external shape of the molded article 10 is made to substantially coincide with the shape of the decorative sheet 30, and preforming can be said to have been performed as long as fabrication is performed from the state of the decorative sheet 30, in which it exhibits a planar shape after the adhesive layer 60 has been formed, to nearly the external shape of the molded article 10.

(2-2) Preprocess

As shown in FIG. 2(a), woven fabrics woven with carbon fibers 22 are overlapped. Furthermore, the epoxy resin is changed to a semi-cured state by permeating the overlapping woven fabrics with the epoxy resin, thereby forming a prepreg 23. The formed prepreg 23 is wrapped onto a resin hollow member 24. A metal pipe 25 is inserted into the resin hollow member 24. The metal pipe 25 reaches an internal space of the resin hollow member 24, and thereby a state results in which there is no air passageway in the resin hollow member 24, into which the metal pipe 25 has been inserted, other than the metal pipe 25. The resin with which the resin hollow member 24 is formed preferably has a temperature characteristic on an order such that it is cureded by the heat applied by the process of manufacturing the molded article 10 but does not melt, and is, for example, a polyamide resin.

(2-3) Decorating Process

As shown in FIG. 2(c), the resin hollow member 24, around which the prepreg 23 is wrapped, is set inside the cavity of the die 90 in the state in which the decorative sheet 30 has been set. Furthermore, by feeding in air via the metal pipe 25, the resin hollow member 24 swells, the prepreg 23 is pressed against the decorative sheet 30 by the pressure of the air fed in via the metal pipe 25, and thereby the adhesive layer 60 tightly contacts the prepreg 23. The arrow shown in FIG. 2(d) indicates the air that is fed into the metal pipe 25. In the state shown in FIG. 2(d), the decorative sheet 30 is heated by the die 90, and thereby the prepreg 23 in the semi-cured state completely cures. The temperature of the die 90 when the prepreg 23 is being cured is a temperature that the decorative sheet 30 can withstand and is set to an appropriate temperature in the range of, for example, 120° C.-150° C. While the prepreg 23 and the adhesive layer 60 are being bonded simultaneously with the prepreg 23 being cured, the epoxy group of the prepreg 23 and the amino group of the adhesive layer 60 react owing to the heat applied to the prepreg 23 and the adhesive layer 60.

In the state shown in FIG. 2(d), the molded-article body 20 and the decorative sheet 30 are held in the die 90 until the prepreg 23 cures; after the prepreg 23 has cured, the molded article 10 is removed from the die 90. As shown in FIG. 2(e), the molded article 10 is composed of the molded-article body 20, in which the fiber-reinforced part 21 is exposed to the surface of the resin hollow member 24 that has swelled, and the decorative sheet 30, which decorates the surface of the molded-article body 20. The fiber-reinforced part 21 is composed of a fiber-reinforced composite material, which contains the fibers and the matrix resin, in which the epoxy resin has cured.

(2-4) Explanation of Deep-Drawing of the Decorative Sheet

Figure 3:
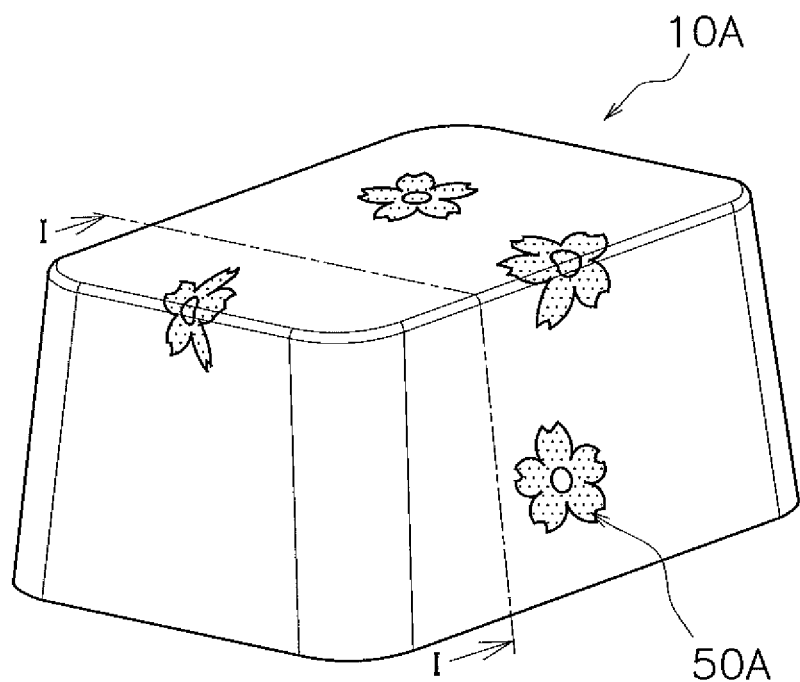
FIG. 3 is an oblique view that shows one example of the molded article.
Figure 4:
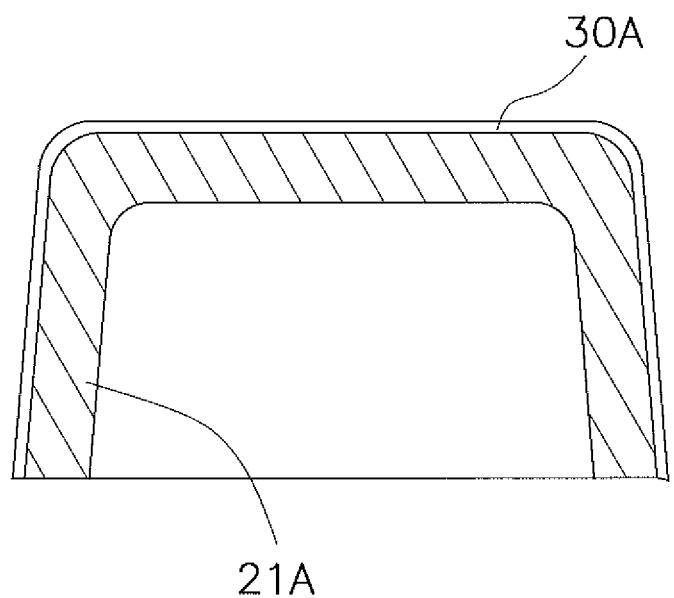
FIG. 4 is a schematic cross-sectional view of the molded article cut along line I-I in FIG. 3.

The molded article shown in FIG. 3 is, for example, a cover member 10A of a container or a casing. FIG. 4 shows a cross section taken along line I-I of the cover member 10A shown in FIG. 3. The cover member 10A has a hollow shape in which a bottom part is opened, and a fiber-reinforced part 21A is formed on the surfaces of the cover member 10A, that is, an upper surface 32, left-right side surfaces, and rear side surfaces. The surfaces of the fiber-reinforced part 21A of the cover member 10A are covered by a decorative sheet 30A. A floral pattern on the surface of the cover member 10A is a pattern that is drawn on a pattern layer 50A of the decorative sheet 30A.

Figure 5:
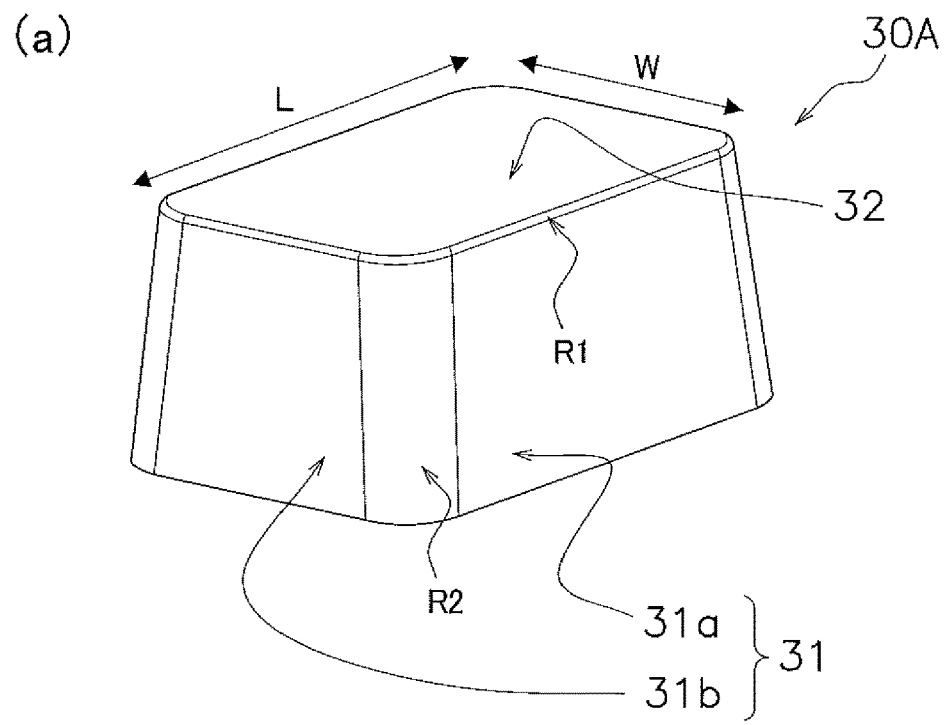
FIG. 5 includes: (a) an oblique view that shows one example of the external shape of the decorative sheet that has been preformed; and (b) a view for explaining the cross-sectional shape of the decorative sheet in FIG. 5(a).
Figure 5:
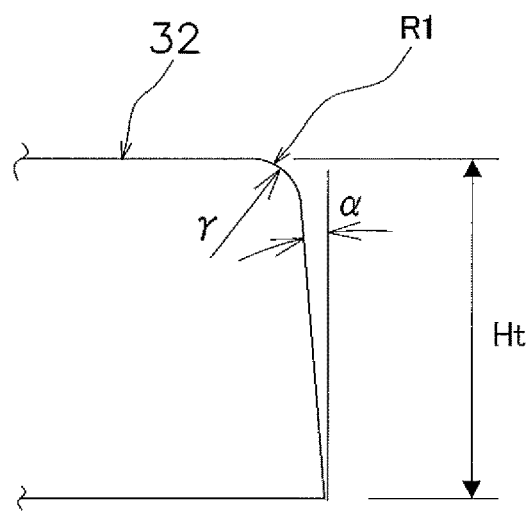

FIG. 5(a) and FIG. 5(b) show the shape of the decorative sheet 30A, which has been formed by a preform process such that it conforms to the external shape of the cover member 10A.

Looking at FIG. 5(a) and FIG. 5(b), it can be understood that the decorative sheet 30A is deeply drawn. The drawability of the decorative sheet is evaluated to ensure that the drawability is good enough to handle a tall height Ht of side surfaces 31, a narrow width W of the upper surface 32, a small angle α of corners R1 formed by the side surfaces 31 and the upper surface 32, and a small radius of curvature γ of the corners R1. In addition, evaluation is performed to ensure that drawability is good enough to handle a small radius of a corner R2 between two side surfaces 31a, 31b. Put differently, being able to handle a tall height of the side surfaces 31 means being able to handle a deep recessed groove in the die that comes into contact with the side surfaces 31. In other words, being able to handle a narrow width of the upper surface 32 means being able to handle a narrow recessed groove in the die that comes into contact with the upper surface 32.

The decorative sheet 30A, which has a thickness of 125 μm and in which a base film of three layers and two types are used as described below, has satisfactory drawability to conform to a shape like the corner R1, in which the side surfaces 31 of the height Ht and the upper surface 32 of the width W as described below are substantially orthogonal and the radius of curvature is γ. It is confirmed that decoration can be performed on the fiber-reinforced part 21 up to a height Ht of 40 mm or less.

For example, if the height Ht is 20 mm, then it is confirmed that the fiber-reinforced part 21 can be satisfactorily decorated if a length L is 60 mm or greater, the width W is 30 mm or greater, the radius of curvature γ is 0.5 mm or greater, the radius of the corner R2 is 5 mm or greater, and the angle α is 3° or greater. Specifically, it is confirmed that the fiber-reinforced part 21 can be satisfactorily decorated if the height Ht is 20 mm, the length L is 60 m, the width W is 30 mm, the radius of curvature γ is 0.5 mm, the radius of the corner R2 is 5 mm, and the angle α is 3°.

In addition, if the height Ht is 40 mm, then it is confirmed that the fiber-reinforced part 21 can be satisfactorily decorated if the length L is 60 m or greater, the width W is 30 mm or greater, the radius of curvature γ is 1 mm or greater, the radius of the corner R2 is 10 mm or greater, and the angle α is up to 5°. Specifically, it is confirmed that the fiber-reinforced part 21 having a height Ht of 40 mm, a length L of 60 m, a width W of 30 mm, a radius of curvature γ of 1 mm, a radius of corner R2 of 10 mm, and an angle α of 5° can be satisfactorily decorated.

In the decorative sheet 30A, the base film is composed of an outer-side acrylic-resin layer, a polycarbonate-resin layer, and an inner-side acrylic-resin layer, the decorative layer is formed using a one-liquid-type design ink in which a thermoplastic resin serves as a resin binder, and an adhesive layer is composed of, as its principal material, an amino ethylated acrylic polymer. For example, an acrylic resin or a vinyl chloride/vinyl acetate copolymer resin is used as the resin binder of the design ink, and using such a resin makes it possible to obtain deep drawability.

If an amino ethylated acrylic polymer is used as the bonding-agent layer, then an adhesive layer is obtained that does not yellow even if a sunshine-carbon-arc-lamp-type weatherometer that conforms to the JIS (Japan Industrial Standards) B 7753 standard is used and a light-resistance test is performed in which an irradiation treatment is performed for 200 h under the condition of a surface spray (falling rain) for 18 min every two hours. The thickness of the base film is preferably set to a range of 100-150 μm, and is set to, for example, 125 μm. Satisfactory drawability is obtained in a base film of such a thickness. If the base film is too thin, then the base film tends to crack; if the base film is too thick, then stiffness increases and it thereby becomes difficult to conform to the external shape of the molded article.

If the thickness of the base film is set to 125 μm, then printability (solvent resistance) is not obtained when the thickness of the inner-side acrylic-resin layer is set to 2.5 μm; when the thickness of the inner-side acrylic-resin layer is set to 5 μm, then improved printability is obtained compared to when the thickness is set to 2.5 μm; and when the thickness of the inner-side acrylic-resin layer is set to 12.5 μm, 20.8 μm, 36.5 μm, or 50 μm, satisfactory printability is obtained. Here, one example of printability was explained; however, sufficient printability can be obtained when the thickness of the base film is in the range of 100-150 μm, as long as the thickness of the inner-side acrylic-resin layer is greater than or equal to 5% of the thickness of the base film.

If the thickness of the base film is set to 125 μm, then heat resistance is not obtained when the thickness of the polycarbonate-resin layer is set to 25 μm; when the thickness of the polycarbonate-resin layer is set to 40 μm, improved heat resistance is obtained compared to when the thickness is set to 25 μm; satisfactory heat resistance is obtained when the thickness of the polycarbonate-resin layer is set to 83.4 μm, 100 μm, 115 μm, or 120 μm. Here, one example of heat resistance was explained; however, sufficient heat resistance can be obtained when the thickness of the base film is in the range of 100-150 μm, as long as the thickness of the polycarbonate-resin layer is greater than or equal to 50% of the thickness of the base film.

In addition, if the thickness of the base film is set to 125 μm, then a hardness of H pencil hardness or greater is not obtained when the thickness of the outer-side acrylic-resin layer is set to 5 μm; a hardness of H pencil hardness or greater is obtained when the thickness of the outer-side acrylic-resin layer is set to 12.5 μm, 20.8 μm, 36.5 μm, or 50 μm. Here, one example of printability was explained; however, when the thickness of the base film is in the range of 100-150 μm, a base film that tends not to get scratched can be obtained by setting the thickness of the outer-side acrylic-resin layer to greater than or equal to 10% of the thickness of the base film.

Second Embodiment (3) OVERVIEW OF MOLDED ARTICLE ACCORDING TO THE SECOND EMBODIMENT The abovementioned first embodiment explained the case in which the base film 40 of the decorative sheet 30 has three layers of two types; however, in the case in which the base film 40 of the decorative sheet 30 does not require high scratch resistance, it is also possible to configure the base film of the decorative sheet with two layers of two types.

Figure 6:
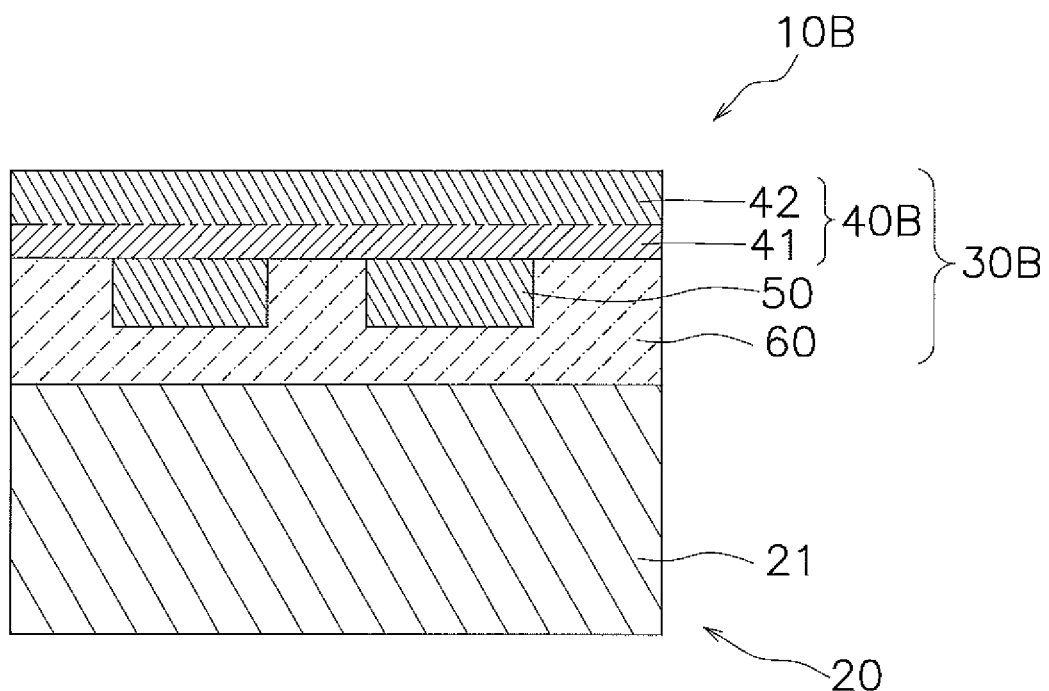
FIG. 6 is a partial, enlarged, cross-sectional view of the vicinity of the surface of the molded article according to a second embodiment.

As shown in FIG. 6, a molded article 10B according to the second embodiment also comprises the molded-article body 20 and a decorative sheet 30B, the same as the molded article 10 according to the first embodiment. The decorative sheet 30B of the second embodiment differs from the decorative sheet 30 of the first embodiment only in the configuration of a base film 40B, and therefore the explanation below addresses only the configuration of the base film 40B, and explanation of other aspects is omitted.

(4) DECORATIVE SHEET 30B

The decorative sheet 30B comprises the base film 40B, the pattern layer 50, and the adhesive layer 60. The pattern layer 50 and the adhesive layer 60 of the decorative sheet 30B can be configured the same as in the decorative sheets 30, 30A. Accordingly, explanation of the pattern layer 50 and the adhesive layer 60 of the decorative sheet 30B is also omitted.

The base film 40B according to the second embodiment is a resin film of two layers of two types (i.e. two layers wherein a resin of one layer is different from that of the other layer), wherein the polycarbonate-resin layer 42 is disposed on the surface side of the molded article 10B. The inner-side acrylic-resin layer 41 is formed of an acrylic resin by, for example, extrusion molding, and the polycarbonate-resin layer 42 is formed of a polycarbonate resin by, for example, extrusion molding. For example, the base film 40B is manufactured by extrusion molding these simultaneously and, simultaneously therewith, coextruding the stacked layers. However, the method of manufacturing the base film 40B is not limited to the molding of multiple layers by co-extrusion as discussed above and may be manufactured using some other manufacturing method such as thermal lamination.

The thickness of the base film 40B is ordinarily 50-400 μm and is preferably 100-200 μm. The same as in the base film 40, the thickness of the inner-side acrylic-resin layer 41 is preferably greater than or equal to 5% of the thickness of the base film 40B to obtain satisfactory printability, and the thickness of the polycarbonate-resin layer 42 is preferably greater than or equal to 50% of the thickness of the base film 40B to obtain the base film 40B having satisfactory heat resistance.

If the cover member 10A, in which the decorative sheet 30A is being decorated, is decorated by the decorative sheet 30B, then the thickness of the base film 40B is preferably set in the range of 100-150 μm and is set to, for example, 125 μm. In the base film 40B having such a thickness, satisfactory drawability is obtained. If the base film 40B is too thin, then the base film 40B tends to crack; if the base film is too thick, then stiffness increases and it becomes difficult for the base film to conform to the external shape of the molded article.

If the thickness of the base film is set to 125 μm, then printability (solvent resistance) is not obtained when the thickness of the inner-side acrylic-resin layer is set to 2.5 µm; when the thickness of the inner-side acrylic-resin layer is set to 5 µm, improved printability is obtained when the thickness is set to 2.5 µm; and when the thickness of the inner-side acrylic-resin layer is set to 12.5 µm, 36.5 µm, or 50 µm, satisfactory printability is obtained. Here, one example of printability was explained; however, sufficient printability can be obtained when the thickness of the base film is in the range of 100-150 µm, as long as the thickness of the inner-side acrylic-resin layer is greater than or equal to 5% of the thickness of the base film. If the thickness of the base film is set to 125 µm, then heat resistance is not obtained when the thickness of the polycarbonate-resin layer is set to 25 µm; when the thickness of the polycarbonate-resin layer is set to 40 µm, improved heat resistance is obtained compared to when the thickness is set to 25 µm; satisfactory heat resistance is obtained when the thickness of the polycarbonate-resin layer is set to 100 µm, 115 µm, or 120 µm. Here, one example of heat resistance was explained; however, sufficient heat resistance can be obtained when the thickness of the base film is in the range of 100-150 µm, as long as the thickness of the polycarbonate-resin layer is greater than or equal to 50% of the thickness of the base film.

(5) MODIFIED EXAMPLES (5-1) Modified Examples 1A, 2A

The abovementioned first embodiment and the abovementioned second embodiment explained cases in which carbon fibers are used as the fibers that constitute the fiber-reinforced composite material, but fibers other than carbon fibers can be used as the fibers. Examples of fibers other than carbon fibers are glass fibers, metal fibers, aromatic-polyamide fibers, polyaramide fibers, alumina fibers, silicon-carbide fibers, and boron fibers. These fibers can be used separately as the fibers that constitute the fiber-reinforced composite materials, or multiple types of fibers can be used in combination as the fibers that constitute the fiber-reinforced composite material.

In addition, the abovementioned first embodiment and the abovementioned second embodiment explained cases in which the prepreg 23 is formed by crossing the reinforced fibers; however, the prepreg may be formed by winding the fibers, or the like.

(5-2) Modified Examples 1B, 2B

The abovementioned first embodiment and the abovementioned second embodiment explained cases in which the epoxy resin is used as the matrix resin, which has the epoxy group, that constitutes the fiber-reinforced composite material; however, it may be a resin other than an epoxy resin, such as a copolymer of an epoxy compound, a modified epoxy resin, or a combination of at least two of these.

(5-3) Modified Examples 1C, 2C

The abovementioned first embodiment and the abovementioned second embodiment explained cases in which a blow-molding method was used as the method of manufacturing the molded article, but the molded article can also be manufactured using a press-forming method.

Figure 7:
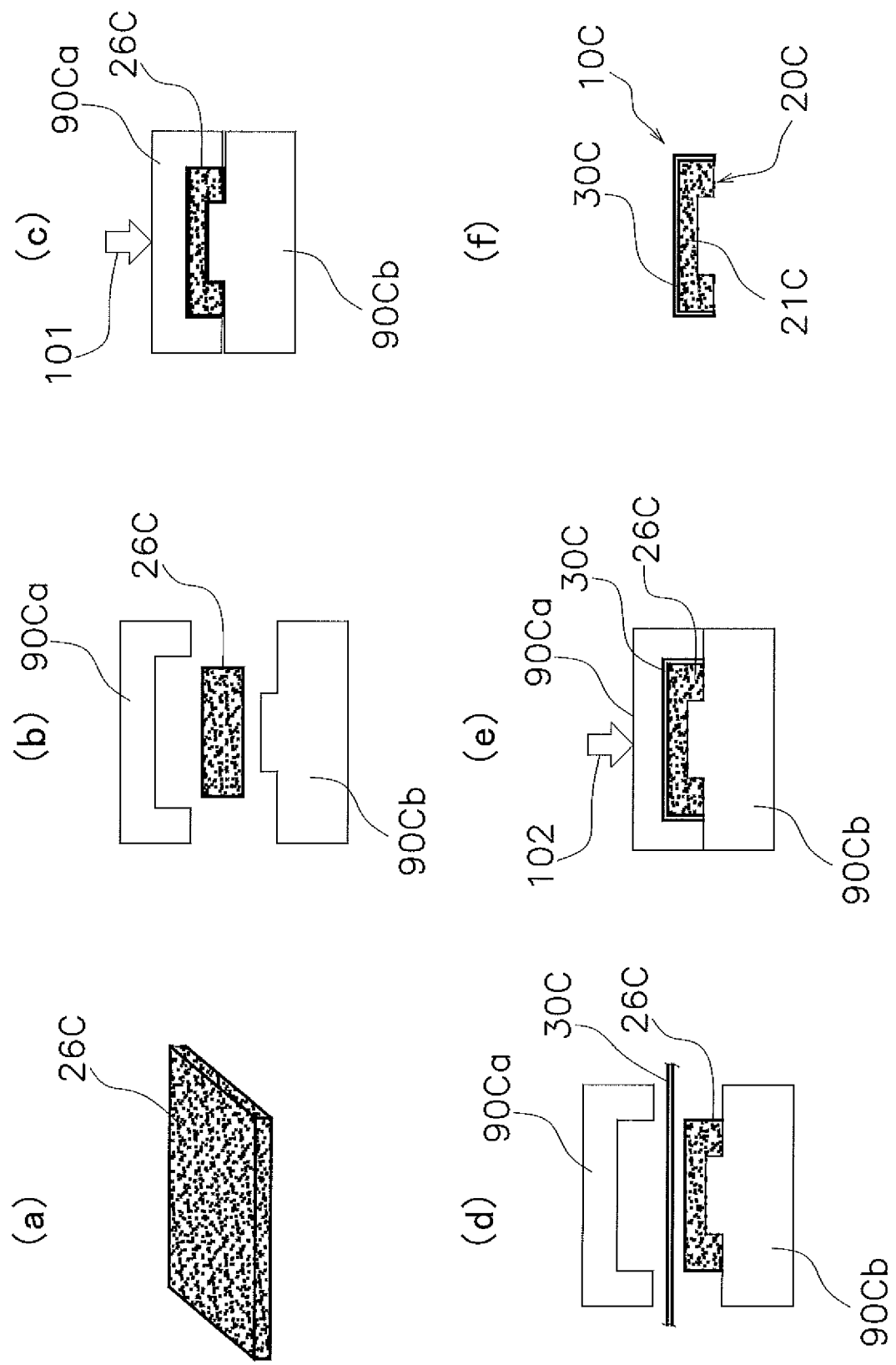
FIG. 7 includes: (a) a conceptual diagram that shows a BMC that has been prepared; (b) a conceptual diagram for explaining a process of preparing the prepreg; (c) a conceptual diagram for explaining the process of preparing the prepreg; (d) a conceptual diagram that shows a process of preparing the decorative sheet; (e) a conceptual diagram that shows the decorating process; and (f) a conceptual diagram for explaining the molded article.

FIG. 7(a) through FIG. 7(f) show a process of manufacturing a molded article 10C using a press-forming method. First, a BMC 26C shown in FIG. 7(a) is prepared. Generally, BMC is an abbreviation for bulk molding compound and is a thermosetting resin into which chopped fibers, a filler, or the like have been mixed and is an intermediate material for compression/injection molding. Next, the BMC 26C is set in press dies 90Ca, 90Cb (refer to FIG. 7(b)), and the BMC 26C is press-formed by the press dies 90Ca, 90Cb and, simultaneously, heated by the press dies 90Ca, 90Cb (refer to FIG. 7(c)). The temperature of the press dies 90Ca, 90Cb at this time is set to an appropriate temperature within a range of, for example, 200° C.-300° C. Furthermore, in FIG. 7(c), an arrow 101 indicates the application of pressure. After a prescribed time has elapsed in the state shown in FIG. 7(c), the press dies 90Ca, 90Cb are opened and the press dies 90Ca, 90Cb and the BMC 26C cool to an appropriate temperature in the range of, for example, 100° C.-120° C. (refer to FIG. 7(c)). The BMC 26C at this time is in a semi-cured state to an extent that the shape of the BMC 26C can be maintained; further, the BMC 26C is in a state in which the epoxy group still remains.

Next, as shown in FIG. 7(d), a decorative sheet 30C is inserted between the press dies 90Ca, 90Cb, wherein the BMC 26C is set. FIG. 7(d) shows the case in which the decorative sheet 30C, which has a planar shape, is inserted, but the inserted decorative sheet 30C may be preformed.

Furthermore, a pressure indicated by an arrow 102 shown in FIG. 7(e) is applied from the press dies 90Ca, 90Cb to the BMC 26C and the decorative sheet 30C such that the state results in which the decorative sheet 30C is brought into contact with the BMC 26C, and thereby the BMC 26C is re-pressed. At this time, the temperature of the press dies 90Ca, 90Cb is raised to an appropriate temperature in the range of, for example, 130° C.-150° C. Owing to the pressure and the temperature at this time, the BMC 26C and the decorative sheet 30C bond, and the epoxy group of the BMC 26C and the amino group of the decorative sheet 30C—which are heated by the press dies 90Ca, 90Cb, whose temperature has been raised in this manner—react.

In the state shown in FIG. 7(e), the BMC 26C and the decorative sheet 30C are held in the press dies 90Ca, 90Cb until the BMC 26C cures, and the molded article 10C is removed from the press dies 90Ca, 90Cb after the BMC 26C has cured. The molded article 10 comprises: the molded-article body 20C, the entirety of which has been strengthened by fiber-reinforced parts 21C; and the decorative sheet 30C, which decorates the surface of the molded-article body 20C.

(5-4) Modified Examples 1D, 2D

The abovementioned first embodiment and second embodiment as well as the modified examples 1C, 2C thereof explained cases in which the molded article 10, 10A-10C is manufactured using the blow-molding method or the press-forming method, but an injection-molding method may be used in the molded-article manufacturing method.

Figure 8:
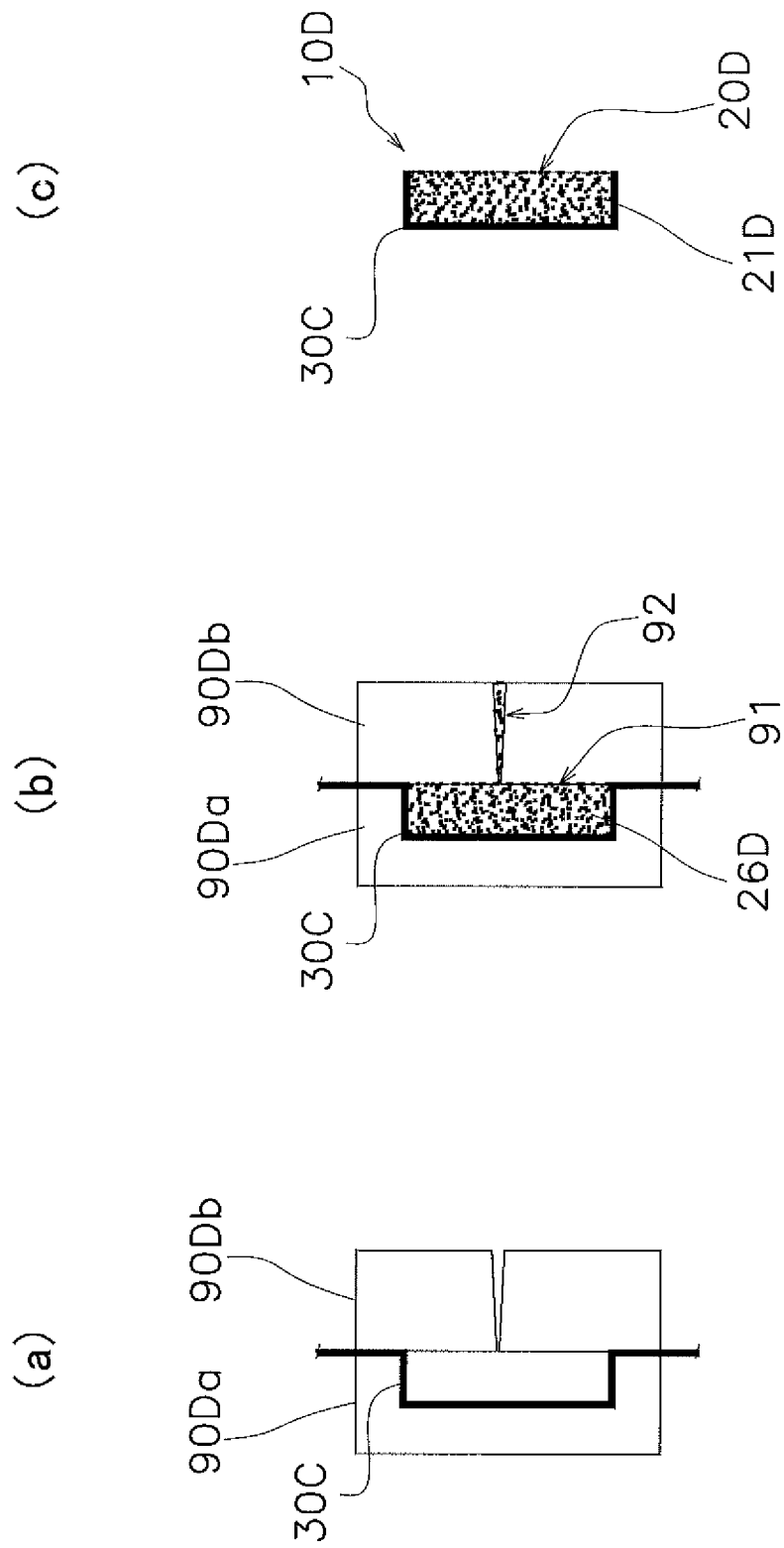
FIG. 8 includes: (a) a conceptual diagram that shows a process of preparing the decorative sheet; (b) a conceptual diagram that shows the decorating process; and (c) a conceptual diagram for explaining the molded article.

In the case of injection molding, as shown in FIG. 8(a), injection-molding dies 90Da, 90Db wherein the preformed decorative sheet 30C is disposed inside a cavity 91 are closed. The decorative sheet 30C has a configuration like the decorative sheet 30, 30B. Furthermore, BMC 26D, which is pressurized and has fluidity, is injected through a sprue 92 into the cavity 91 of the heated injection-molding dies 90Da, 90Db (refer to FIG. 8(b)). Furthermore, as shown in FIG. 8(b), in the state in which the BMC 26D has filled the interior of the cavity 91, the state in which heat and pressure are applied is maintained for a prescribed time, and thereby the BMC 26D is cured. At this time, a molded-article body 20D (refer to FIG. 8(c)), in which the BMC 26D has cured, and a decorative sheet 30C are bonded, and the epoxy group of the BMC 26D and the amino group of the decorative sheet 30C react.

After the BMC 26D has cured, a molded article 10D, which is shown in FIG. 8(c), is removed from the injection-molding dies 90Da, 90Db. The molded article 10D is composed of the molded-article body 20D, the entirety of which is reinforced by a fiber-reinforced part 21D, and the decorative sheet 30C, which decorates the surface of the molded-article body 20D.

(5-5) Modified Examples 1E, 2E

Figure 9:
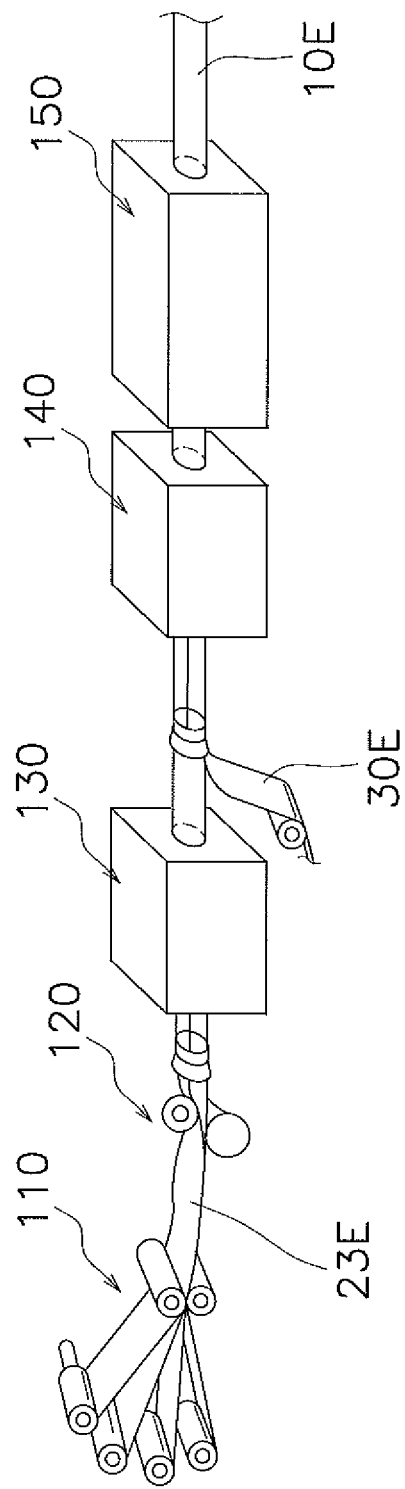
FIG. 9 is a conceptual diagram for explaining modified examples 1E, 2E of the first embodiment and the second embodiment.

The abovementioned first embodiment and second embodiment as well as the modified examples 1C, 2C, 1D, 2D thereof explained cases in which the molded article 10, 10A-10D is discontinuously manufactured using the blow-molding method, the press-forming method, or the injection-molding method, but the molded article may be continuously manufactured using, for example, a pultrusion method. FIG. 9 is a conceptual diagram of a forming process in which a pipe-shaped molded article 10E is formed using a pultrusion method. A prepreg 23E, which is supplied from a prepreg supply apparatus 110, is fabricated from a flat shape into a cylindrical shape by a fabrication apparatus 120. By passing through the inside of a high-temperature first die 130, the prepreg 23E, which has a cylindrical shape, transitions to a semi-cured state. In the next process, a decorative sheet 30E is caused to cover the cylindrical prepreg 23E in the semi-cured state. Furthermore, when the cylindrical prepreg 23E, the surface of which has been covered by the decorative sheet 30E, passes through a second die 140, heat and pressure are applied, which further advances the curing of the prepreg 23E, and thereby the prepreg 23E and the decorative sheet 30E are bonded. The prepreg 23E, whereto the decorative sheet 30E is bonded, passes through the interior of an oven 150 and is completely cured, and thereby the cylindrical molded article 10E is manufactured continuously.

(6) FEATURES

6-1

In the present disclosure as explained above, heat resistance that can withstand the heat applied when the epoxy group of the matrix resin and the amino group of the adhesive layer 60 are caused to react is obtained by the polycarbonate-resin layer 42. In addition, drawability (strength) that can withstand the force applied when the decorative sheet 30, 30A-30E is caused to conform to the molded-article body 20, 20C, 20D is likewise obtained by the polycarbonate-resin layer 42. In addition, printability needed to print the pattern layer 50, 50A, which is the decorative layer, on the base film 40, 40B is obtained by the inner-side acrylic-resin layer 41. It is possible to prevent the polycarbonate-resin layer 42 from getting damaged during formation of the adhesive layer 60, which includes an amino ethylated acrylic polymer, that is, an amino-group-containing compound in which a solvent is used. As a result, the molded-article body 20, 20C, 20D, in which the fiber-reinforced part 21, 21A, 21C, 21D composed of the fiber-reinforced composite material is exposed to the surface, can be satisfactorily decorated by the decorative sheet 30, 30A-30E. In particular, by using the decorative sheet 30, 30A-30E, deep drawing becomes easy.

6-2

The base film 40 further comprises the outer-side acrylic-resin layer 43, which contains the acrylic resin, on the side opposite the inner-side acrylic-resin layer 41; and the inner-side acrylic-resin layer 41 and the outer-side acrylic-resin layer 43 sandwich the polycarbonate-resin layer 42. As a result, the outer-side acrylic-resin layer 43 exists on the outer-surface side of the polycarbonate-resin layer 42, and therefore hardness is improved by the outer-side acrylic-resin layer 43 on the surface side of the decorated molded article 10, 10A, 10C-10E, the polycarbonate-resin layer 42 is protected, the decorative sheet 30, 30A, 30C-30E tends not to get scratched, and thereby the surface of the molded article is prevented from getting scratched.

6-3

The inner-side acrylic-resin layer 41 has a thickness of greater than or equal to 5% of the thickness of the base film 40, 40B. As a result, the inner-side acrylic-resin layer 41 exhibits satisfactory printability.

6-4

In the range in which the inner-side acrylic-resin layer 41 has a thickness of greater than or equal to 5% of the thickness of the base film, the polycarbonate-resin layer 42 has a thickness of greater than or equal to 50% of the thickness of the base film 40, 40B. As a result, satisfactory heat resistance is exhibited by the polycarbonate-resin layer 42.

6-5

The matrix resin of the fiber-reinforced part 21, 21A, 21C, 21D is formed of the epoxy resin. Because the matrix resin of the fiber-reinforced part 21, 21A, 21C, 21D is formed of the epoxy resin, it becomes easy to manufacture the molded article 10, 10A-10E that is light and has excellent strength.

6-6

If the amino-group-containing compound of the adhesive layer 60 is the polyacrylamide resin, and the adhesive layer 60 is composed of polyacrylamine as its main component, then the stability of the adhesive layer 60 is improved and handling of the decorative sheet 30, 30A-30E becomes easy.

6-7

If the preparing process in the molded-article manufacturing method is configured such that it includes the preform process that fabricates the decorative sheet 30, 30A-30D from a planar shape into a three-dimensional shape that approaches the external shape of the molded article 10, 10A-10D, then, in the decorating process, the decorative sheet fabricated into the three-dimensional shape is disposed inside the dies 90, 90Ca, 90Cb, 90Da, 90Db, and the decorative sheet 30, 30A-30D and the fiber-reinforced part 21, 21C, 21D are heated and subject to pressure by the dies 90, 90Ca, 90Cb, 90Da, 90Db. In so doing, the decorative sheet 30, 30A-30D bonds to the fiber-reinforced part 21, 21C, 21D, whereupon the decorative sheet 30, 30A-30D tends to conform to the external shape of the molded-article body 20, 20C, 20D, and thereby the finish of the external appearance of the molded article 10, 10A-10D is improved.

6-8

Prior to the decorating process, a preprocess is performed in which, as shown in FIG. 2(b), FIG. 7(c), and FIG. 9, a semi-cured state results wherein the matrix resin of the prepreg 23, 23E, the BMC 26C, and the like can react with the amino group of the amino-group-containing compound, and the matrix resin of the prepreg 23, 23E, the BMC 26C, and the like can be plastically worked. Furthermore, the decorating process shown in FIG. 2(d), FIG. 7(e), and FIG. 9 is a simultaneous, forming-and-decorating process in which the decorative sheet 30, 30A, 30C, 30E, which has been brought into contact with the prepreg 23, 23E in the semi-cured state, the matrix resin of the BMC 26C, and the like, is heated and subject to pressure, and thereby the prepreg 23, 23E, the matrix resin of the BMC 26C, and the like reacts with the amino group of the adhesive layer 60; simultaneously therewith, the curing of the prepreg 23, 23E, the BMC 26C, and the like progresses, and thereby the fiber-reinforced part 21, 21A, 21C is formed; owing to such a simultaneous, forming-and-decorating process, the unity of the decorative sheet 30, 30A, 30C, 30E and the molded-article body 20, 20C is improved, and the molded article 10, 10A, 10C, 10E having a beautiful external appearance, high strength, and reduced weight can be manufactured.

6-9

In the preprocess, for example, in the process shown in FIG. 7(c), the temperature is higher than the heating temperature in the simultaneous, forming-and-decorating process, and therefore the matrix resin transitions to the semi-cured state. In addition, even if the prepreg 23 shown in FIG. 2(b) is one in which it transitions to the semi-cured state at a temperature higher than the forming temperature in FIG. 2(d), such a case corresponds to the case in which the matrix resin transitions to the semi-cured state at a temperature higher than the heating temperature in the simultaneous, forming-and-decorating process. For example, in the process shown in FIG. 7(c), the BMC 26C transitions to the semi-cured state at an appropriate temperature within the range of 200° C.-300° C. By adopting such a configuration, a matrix resin in a satisfactory semi-cured state is obtained, deterioration of the decorative sheet 30, 30C by the heat can be prevented, and it becomes easy to manufacture a molded article having a beautiful external appearance, high strength, and reduced weight. The same effects are exhibited even in the case in which the temperature of the first die 130 shown in FIG. 9 is set higher than the temperature of the second die 140.

The above explained one or more embodiments of the present disclosure, but the present disclosure is not limited to the above embodiments and various modifications can be effected within a scope that does not depart from the gist of the disclosure. In particular, the embodiments and modified examples written in the present specification can be arbitrarily combined as needed.

REFERENCE SIGNS LIST 10, 10B-10E Molded article
10A Cover member (example of the molded article)
20, 20C, 20D Molded-article body
21, 21A, 21C-21D Fiber-reinforced part
23, 23E Prepreg
26C BMC
30, 30A-30E Decorative sheet
40, 40B Base film
41 Inner-side acrylic-resin layer
42 Polycarbonate-resin layer
43 Outer-side acrylic-resin layer
50, 50A Pattern layer
60 Adhesive layer
90 Die
90Ca, 90Cb Press dies
90Da, 90Db Injection-molding dies
120 First die
130 Second die

The invention claimed is:

1. A molded-article manufacturing method comprising:
    a decorating process that decorates a surface of a molded-article body using a decorative sheet comprising an adhesive layer that contains an amino-group-containing compound, a decorative layer, and a base film whereon the adhesive layer and the decorative layer are formed by
        bringing the adhesive layer of the decorative sheet into contact with a fiber-reinforced part of the molded-article body wherein the fiber-reinforced part, which contains a matrix resin having fibers and an epoxy group, is on the surface, and
        causing the matrix resin and an amino group of the amino-group-containing compound to react, thereby causing the adhesive layer to bond with the fiber-reinforced part;
    wherein the base film has an inner-side acrylic-resin layer, which contains an acrylic resin, and a polycarbonate-resin layer, which contains a polycarbonate resin; and
    wherein the inner-side acrylic-resin layer is disposed on the decorative layer, and the polycarbonate-resin layer is disposed on the inner-side acrylic-resin layer.

2. The molded-article manufacturing method according to claim 1, wherein the matrix resin is formed of an epoxy resin.

3. The molded-article manufacturing method according to claim 2, wherein the amino-group-containing compound is a polyacrylamine, and the adhesive layer is composed of a polyacrylamine as its main component.

4. The molded-article manufacturing method according to claim 3, further comprising:
    a preform process that fabricates the decorative sheet from a planar shape into a three-dimensional shape that approaches the external shape of the molded article;
    wherein in the decorating process, the decorative sheet which was fabricated into the three-dimensional shape is disposed inside a die, heat and pressure are applied to the decorative sheet and the fiber-reinforced part by the die, and thereby the decorative sheet bonds to the fiber-reinforced part.

5. The molded-article manufacturing method according to claim 4, further comprising:
    a preprocess that, prior to the decorating process, changes the matrix resin to a semi-cured state in which a reaction with the amino group of the amino-group-containing compound is possible, and plastically works the matrix resin;
    wherein the decorating process is a simultaneous forming-and-decorating process in which heat and pressure are applied to the decorative sheet which has been brought into contact with the matrix resin in the semi-cured state, and the matrix resin and the amino group of the adhesive layer react, and, simultaneously therewith, the fiber-reinforced part is formed.

6. The molded-article manufacturing method according to claim 5, wherein in the preprocess, the matrix resin transitions to the semi-cured state at a temperature that is higher than the heating temperature of the simultaneous forming-and-decorating process.

7. The molded-article manufacturing method according to claim 2, wherein
a preparing process includes a preform process that fabricates the decorative sheet from a planar shape into a three-dimensional shape that approaches the external shape of the molded article; and
wherein, in the decorating process, the decorative sheet which was fabricated into the three-dimensional shape is disposed inside a die, heat and pressure are applied to the decorative sheet and the fiber-reinforced part by the die, and thereby the decorative sheet bonds to the fiber-reinforced part.

8. The molded-article manufacturing method according to claim 7, further comprising:
a preprocess that, prior to the decorating process, changes the matrix resin to a semi-cured state in which a reaction with the amino group of the amino-group-containing compound is possible, and plastically works the matrix resin;
wherein the decorating process is a simultaneous forming-and-decorating process in which heat and pressure are applied to the decorative sheet which has been brought into contact with the matrix resin in the semi-cured state, and the matrix resin and the amino group of the adhesive layer react, and, simultaneously therewith, the fiber-reinforced part is formed.

9. The molded-article manufacturing method according to claim 8, wherein in the preprocess, the matrix resin transitions to the semi-cured state at a temperature that is higher than the heating temperature of the simultaneous forming-and-decorating process.

10. The molded-article manufacturing method according to claim 2, further comprising:
a preprocess that, prior to the decorating process, changes the matrix resin to a semi-cured state in which a reaction with the amino group of the amino-group-containing compound is possible, and plastically works the matrix resin;
wherein the decorating process is a simultaneous forming-and-decorating process in which heat and pressure are applied to the decorative sheet which has been brought into contact with the matrix resin in the semi-cured state, and the matrix resin and the amino group of the adhesive layer react, and, simultaneously therewith, the fiber-reinforced part is formed.

11. The molded-article manufacturing method according to claim 10, wherein in the preprocess, the matrix resin transitions to the semi-cured state at a temperature that is higher than the heating temperature of the simultaneous forming-and-decorating process.

12. The molded-article manufacturing method according to claim 1, wherein
a preparing process includes a preform process that fabricates the decorative sheet from a planar shape into a three-dimensional shape that approaches the external shape of the molded article; and
in the decorating process, the decorative sheet which was fabricated into the three-dimensional shape is disposed inside a die, heat and pressure are applied to the decorative sheet and the fiber-reinforced part by the die, and thereby the decorative sheet bonds to the fiber-reinforced part.

13. The molded-article manufacturing method according to claim 12, further comprising:
a preprocess that, prior to the decorating process, changes the matrix resin to a semi-cured state in which a reaction with the amino group of the amino-group-containing compound is possible, and plastically works the matrix resin;
wherein the decorating process is a simultaneous forming-and-decorating process in which heat and pressure are applied to the decorative sheet which has been brought into contact with the matrix resin in the semi-cured state, and the matrix resin and the amino group of the adhesive layer react, and, simultaneously therewith, the fiber-reinforced part is formed.

14. A molded article comprising:
a molded-article body in which a fiber-reinforced part, which contains fibers and a matrix resin, is on a surface, and the matrix resin is formed of an epoxy resin; and
a decorative sheet that is disposed on the molded-article body, is bonded to the fiber-reinforced part, and decorates the surface of the molded-article body;
wherein the decorative sheet comprises
an adhesive layer that forms the bond to the fiber-reinforced part and includes a reaction product of an epoxy group of the matrix resin and an amino group of an amino-group-containing compound,
a decorative layer that is disposed on the adhesive layer and that decorates the surface of the molded-article body, and
a base film that is disposed on the decorative layer and comprises an inner-side acrylic-resin layer, which contains an acrylic resin, and a polycarbonate-resin layer,
which contains a polycarbonate resin; and
wherein, in the base film, the inner-side acrylic-resin layer is disposed on the decorative layer, and the polycarbonate-resin layer is disposed on the inner-side acrylic-resin layer.

15. The molded article according to claim 14, wherein the base film further comprises an outer-side acrylic-resin layer that contains an acrylic resin on the side opposite the inner-side acrylic-resin layer, wherein the inner-side acrylic-resin layer and the outer-side acrylic-resin layer sandwich the polycarbonate-resin layer.

16. The molded article according to claim 15, wherein the inner-side acrylic-resin layer has a thickness that is greater than or equal to 5% of the thickness of the base film.

17. The molded article according to claim 16, wherein the polycarbonate-resin layer has a thickness that is greater than or equal to 50% of the thickness of the base film.

18. The molded article to claim 14, wherein the inner-side acrylic-resin layer has a thickness that is greater than or equal to 5% of the thickness of the base film.

19. The molded article according to claim 18, wherein the polycarbonate-resin layer has a thickness that is greater than or equal to 50% of the thickness of the base film.

* * * * *